United States Patent
Lloyd et al.

(10) Patent No.: US 8,599,026 B2
(45) Date of Patent: Dec. 3, 2013

(54) ANIMAL CONTROL SYSTEM

(75) Inventors: Jeffrey D. Lloyd, Rockford, TN (US);
Ronald T. Schwalb, Rockford, TN (US);
Kevin L. Kirkland, Rockford, TN (US);
Richard Todd, Knoxville, TN (US);
Travis Lay, Knoxville, TN (US); James Gorman, Rockford, TN (US); Janet Kintz-Early, Rockford, TN (US); J. Adrian Barnes, Knoxville, TN (US)

(73) Assignee: Nisus Corporation, Rockford, TN (US)

( * ) Notice: Subject to any disclaimer, the term of this patent is extended or adjusted under 35 U.S.C. 154(b) by 393 days.

(21) Appl. No.: 12/943,481

(22) Filed: Nov. 10, 2010

(65) Prior Publication Data
US 2011/0109460 A1 May 12, 2011

Related U.S. Application Data

(60) Provisional application No. 61/260,207, filed on Nov. 11, 2009.

(51) Int. Cl.
*G08B 23/00* (2006.01)
(52) U.S. Cl.
USPC .......................... 340/573.2; 43/58
(58) Field of Classification Search
USPC ........... 340/573.2, 573.1; 43/58, 61, 107, 114
See application file for complete search history.

(56) References Cited

U.S. PATENT DOCUMENTS

| | | | |
|---|---|---|---|
| 5,949,636 A | 9/1999 | Johnson et al. | |
| 6,052,066 A | 4/2000 | Su | |
| 6,166,641 A | 12/2000 | Oguchi et al. | |
| 6,281,799 B1 | 8/2001 | Lake et al. | |
| 6,937,156 B2 | 8/2005 | Gardner, Jr. et al. | |
| 7,509,770 B2 * | 3/2009 | Gardner et al. | 43/58 |
| 7,530,195 B2 | 5/2009 | Muller et al. | |
| 2005/0097808 A1 * | 5/2005 | Vorhies et al. | 43/58 |
| 2006/0143974 A1 | 7/2006 | Pollmann | |
| 2009/0102600 A1 | 4/2009 | Noe et al. | |
| 2009/0192763 A1 * | 7/2009 | Gardner et al. | 43/58 |

FOREIGN PATENT DOCUMENTS

WO    WO9818318    5/1998

* cited by examiner

*Primary Examiner* — John A Tweel, Jr.
(74) *Attorney, Agent, or Firm* — Luedeka Neely Group, P.C.

(57) ABSTRACT

An animal control system for use in a plant to facilitate management of the trapping of animals in the plant, the system including: a plurality of animal traps located at discrete locations of the plant, each trap including an animal sensor associated with the trap for detecting an animal trapped in the trap and a transceiver in electronic communication with the animal sensor, the transceiver having an identifier unique to the trap with which it is associated; and a computer system having a plurality of computers in communication with one another for receiving and reporting information relating to conditions of the traps. The discrete locations of the traps are obtained and input into a computer processor for processing to yield a computer generated template of the plant having a template of the plant with the discrete locations of the traps.

14 Claims, 11 Drawing Sheets

Plant 1 from Jan. 1, '10 to Feb 15, '10

Remote Transceiver Block Diagram

Master Base Unit Block Diagram

ANIMAL CONTROL SYSTEM

CROSS-REFERENCE TO RELATED APPLICATION

This application claims priority to U.S. Provisional Application Ser. No. 61/260,207, filed Nov. 11, 2009, and entitled "Animal Control System," incorporated by reference herein in its entirety.

BACKGROUND

Rodents and other small animals are common pests in industrial plant settings, especially food processing facilities. The presence of these animals in a plant is undesirable. For example, animals can carry disease agents. These animals also often damage plant equipment, such as by chewing wires and the like. In plant settings, especially in the case of food processing plants, the use of pesticides may be limited. Thus, it becomes necessary to trap and remove the pests.

Plants typically utilize professional pest control providers to manage control of such pests. As part of this, however, it is desirable to maintain accurate records of both pest control problems and the treatment thereof. For example, it is useful for both the pest control provider and the plant management to know where problem areas in the plant are and how effectively they are being treated.

The present disclosure relates to improved systems in the field of animal control in industrial plant settings.

SUMMARY

The above and other needs are met by improved apparatus according to the disclosure for trapping animals in a plant. The apparatus includes a plurality of animal traps located at discrete locations of the plant, each trap including an animal sensor for detecting an animal trapped by the trap and a transceiver in electronic communication with the animal sensor. The transceiver has an identifier and when the sensor detects an animal trapped by the trap, the sensor sends a signal to the transceiver;

The apparatus also includes a computer system having a plurality of computers in communication with one another for receiving and reporting information relating to conditions of the traps. The computer system includes a master base computer proximate the plant and in communication with the transceiver of each of the traps for receiving information from the transceiver and sending information to the transceiver of each of the traps, professional computer, a plant computer, and a provider computer remote from the plant and the master base computer and in communication with the professional computer and the plant computer for sending and receiving information therebetween.

The apparatus also includes a portable layout template of the plant onto which a user identifies the discrete locations of the traps. Also, input means enable the discrete locations of the traps to be input from the layout template into a computer processor for processing to yield a computer generated template of the plant having a template of the plant with the discrete locations of the traps.

In another embodiment, the apparatus includes a plurality of animal traps located at discrete locations of the plant, each trap including an animal sensor for detecting an animal trapped by the trap and a transceiver in electronic communication with the animal sensor, the transceiver having an identifier. When the sensor detects an animal trapped by the trap the sensor sends a signal to the transceiver. The apparatus also includes a computer system having a plurality of computers in communication with one another for receiving and reporting information relating to conditions of the traps.

The computer system includes a master base computer proximate the plant and in communication with the transceiver of each of the traps for receiving information from the transceiver and sending information to the transceiver of each of the traps, professional computer, a plant computer, and a provider computer remote from the plant and the master base computer and in communication with the professional computer and the plant computer for sending and receiving information therebetween.

In this embodiment, a portable GPS locator transceiver is included. The GPS locator transceiver is operable to communicate with each one of the transceivers and to identify each of the discrete locations of the traps. The apparatus also includes input means for inputting the discrete locations of the traps from the portable GPS locator transceiver into a computer processor for processing to yield a computer generated template of the plant having a template of the plant with the discrete locations of the traps.

In yet a further embodiment, the apparatus includes a plurality of animal traps located at discrete locations of the plant, each trap including an animal sensor associated with the trap for detecting an animal trapped in the trap and a transceiver in electronic communication with the animal sensor, the transceiver having an identifier unique to the trap with which it is associated. The apparatus also includes a computer system having a plurality of computers in communication with one another for receiving and reporting information relating to conditions of the traps. The apparatus includes means for obtaining and inputting the discrete locations and identifiers into a computer processor for processing to yield a computer generated template of the plant having a template of the plant with the discrete locations of each of the traps identified.

BRIEF DESCRIPTION OF THE DRAWINGS

Further advantages of the disclosure are apparent by reference to the detailed description when considered in conjunction with the figures, which are not to scale so as to more clearly show the details, wherein like reference numbers indicate like elements throughout the several views, and wherein.

DETAILED DESCRIPTION

Figure 1:
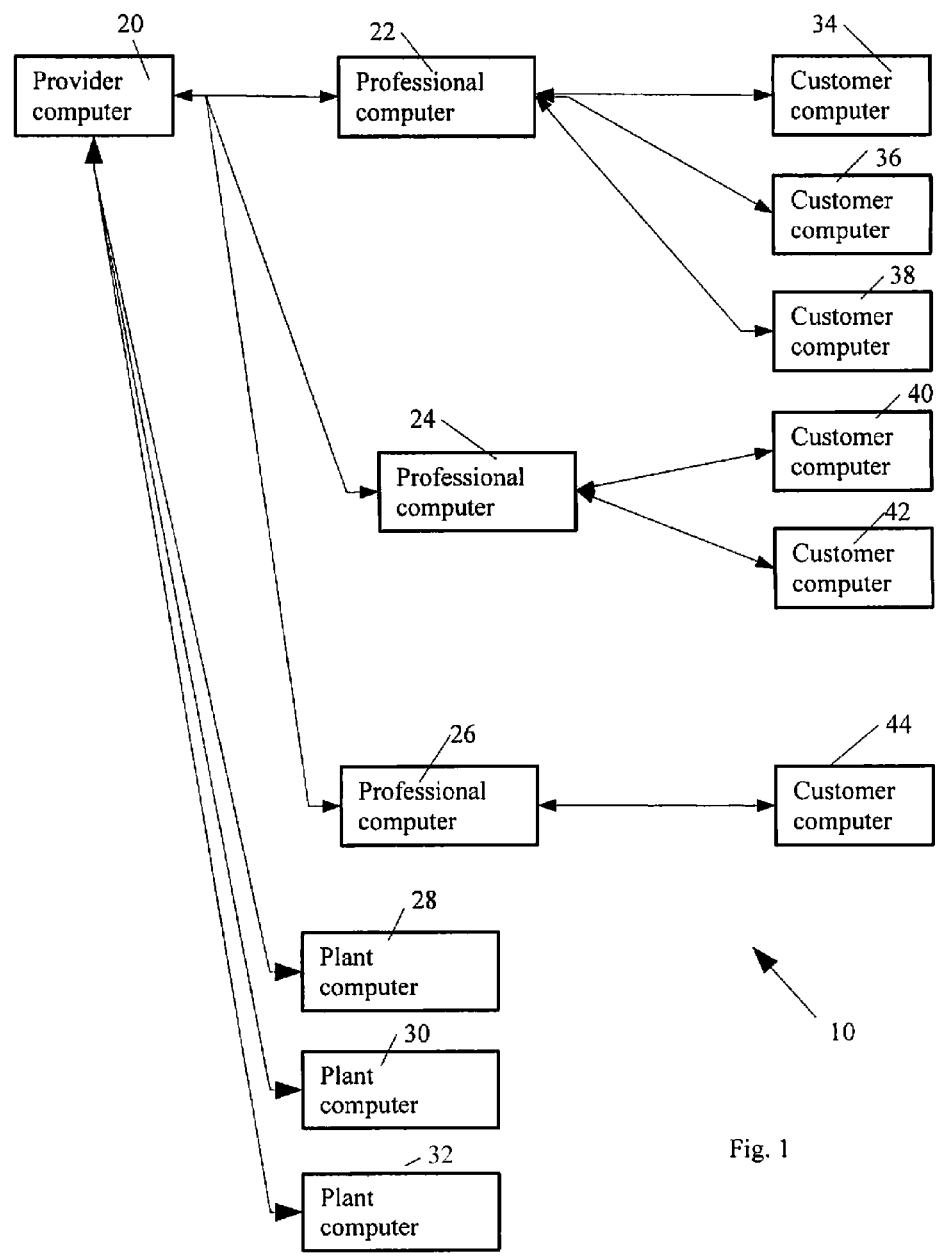
FIG. 1 is a block diagram of computer connections used in an animal control system according to the disclosure.

Referring now to the drawings in which like reference characters designate like or corresponding parts throughout the several views, there is shown in FIG. 1 a block diagram of computer connections used in an animal control system 10 of the present disclosure. The animal control system 10 is used to catch or monitor animals such as mice, rats, rodents or other animals. The system 10 reports captured or monitored animals to professionals as shown in FIG. 1 and the professionals may provide reports to their customers if they choose.

Referring to FIG. 1, the system 10 includes a provider computer 20 shown connected to three professional computers 22, 24 and 26 and also connected to three plant computers 28, 30 and 32. In operation, the plant computers 28, 30 and 32 report to the provider computer 20 when and how many animals have been detected or captured. Preferably, the location of each captured animal is also provided from the plant computer to the provider computer 20. The provider computer then reports the information to the professional computers 22, 24 and 26. The professional computers 22 may be responsible for the plant computer 28 and, thus, the provider computer would only provide information to the professional computer 22 regarding the plant computer 28. Likewise, if the professional who owns computer 24 is responsible for the plant corresponding to plant computer 30, the information from plant computer 30 would only be reported to the professional computer 24. The information provided by the provider computer to the professional computers is used by the professionals to decide when they should service the plants and what traps have captured animals.

Typically the professional computers 22, 24 and 26 are connected to customer computers, such as customer computers 34-44. Again, each professional may have more than one customer and thus, its computer would be connected or may be connected to more than one customer. The professional reports to each customer only the information relevant to its plants. The information provided by the provider computer to the professional computer is not the same information that is provided by the professional computer to the customer computer. The professional needs to have timely information to enable it to monitor and maintain the traps in the plants. On the other hand, the customer needs to have reports on a less timely manner so that it is fully informed as to how its pest control plan is working in each of its plants.

Figure 2:
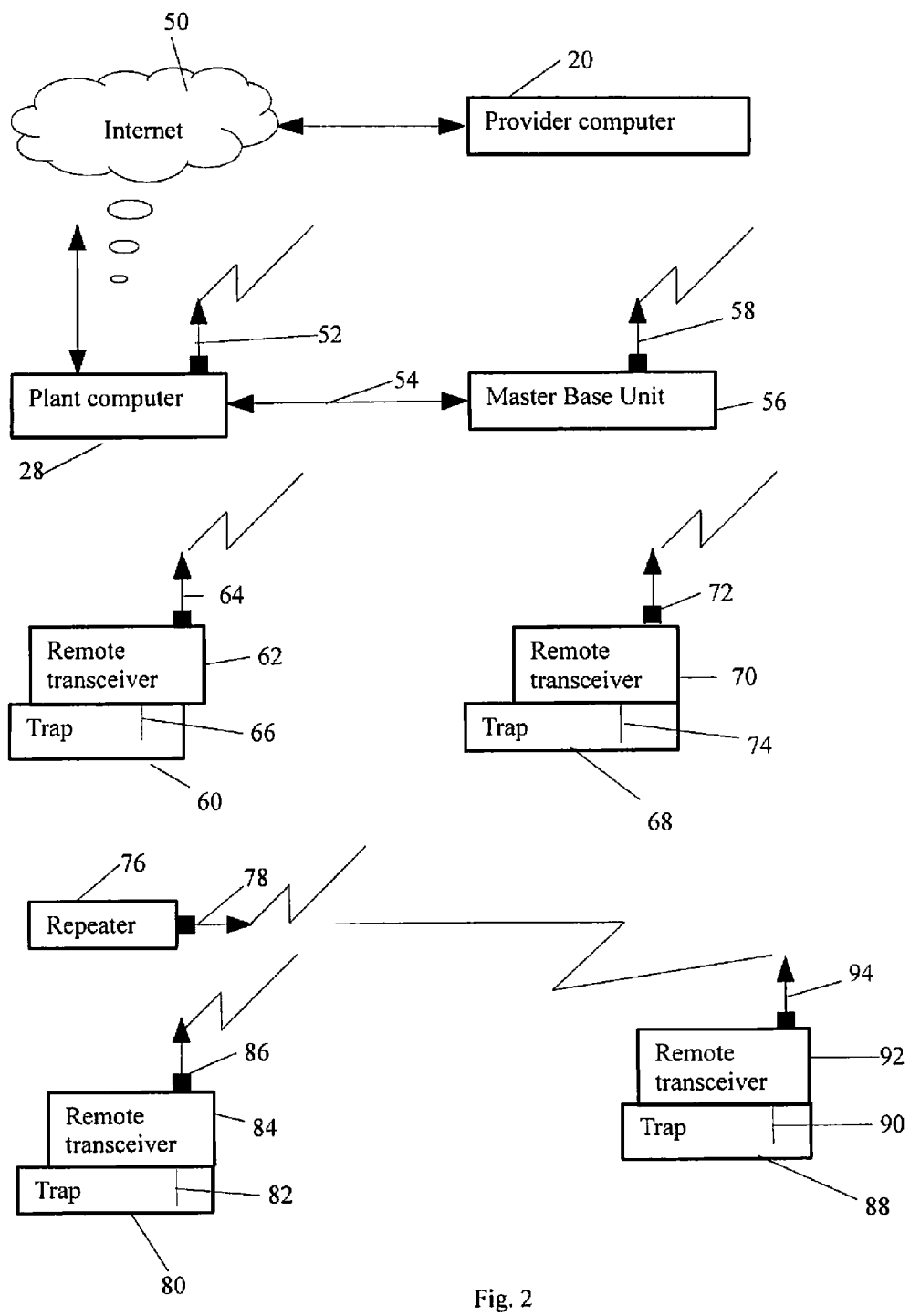
FIG. 2 is a block diagram illustrating the animal control system at a typical plant.

Referring now to FIG. 2, there is shown a block diagram illustrating the animal control system at a typical plant. In this figure, the plant computer 28 is shown connected through the Internet 50 to the provider computer 20. The plant computer could also be connected to the provider computer by telephone connections, wireless telephone connections or other communication systems. The plant computer 28 is also connected to a master base unit 56 as illustrated by line 54. This connection could be a hard wired computer to computer connection or the connection could be made through a wireless network. Thus, both the plant computer 28 and the master base unit computer 56 are shown with wireless antennas 52 and 58 illustrating that the two units may communicate wirelessly.

The master base unit 56 is a computer based communication unit that receives information concerning the status of various base stations disposed throughout the plant and it reports that information to the plant computer 28. Thus, the master base unit 56 communicates with a plurality of animal traps such as traps 60, 68, 80 and 88 shown in FIG. 2. It will be understood that the traps 60, 68, 80, and 88 may take various structural configurations to be suitable for enabling an animal to enter into an enclosed or other trapping area of the trap and for serving to maintain the animal within the trapping area. For example, the trap may include a funnel entrance having a large access end adjacent the exterior of the trap, with the funnel exiting to an enclosed area of the trap, with a very small exit area into which the animal typically does not re-enter. Other structures may include one-way doors and the like which serve to allow an animal to enter through but not easily exit through, effectively trapping the animal within the interior or enclosed area of the trap.

Referring to trap 60, it is equipped with a remote transceiver 62 that is connected to an animal sensor 66, preferably an electronic sensor, for detecting when an animal is captured in the trap 60. The sensor 66 may be located on a wall 60a of the trap 60. When the sensor 66 indicates the presence of an animal, the remote transceiver 62 communicates that event wirelessly to the master base unit 56. Antenna 64 on remote transceiver remote 62 illustrates this wireless communication. While wireless communication is preferred, other forms of communication could be used as well, such as hard wired communication systems.

The trap 68 is likewise equipped with a remote transceiver 70, a sensor 74, and a wireless communication antenna 72. The traps 60 and 68 are near the master base unit 56 and illustrate the fact that each of the traps may communicate with the master base unit 56 directly. However, other traps may be remote from the master base unit 56 such that wireless communication is difficult and in such cases repeaters may be used such as a repeater 76. The traps 80 and 88 each have animal sensors 82 and 90, transceivers 84 and 92 and antennas 86 and 94, respectively. Because they are distant from the master base unit 56, each of the traps 80 and 88 have signals that are repeated by the repeater 76 and are eventually received by the master base unit 56.

Although only four traps are shown in FIG. 2, it will be understood that most plants will have many more traps located both inside and outside of the plant and this figure has been simplified for purposes of illustration. As will hereinafter be described in greater detail, each of the remote transceivers, such as the remote transceiver 62 is battery powered and, thus, they are designed to require a minimum of power. The transceiver 62 is a microprocessor based unit that is programmed to sleep most of the time. The sensor 66 is connected to the remote transceiver 62 and when an animal triggers the sensor 66, a signal is sent to the remote transceiver 62 that wakes up the transceiver 62. The sensor 66 is designed to operate at an extremely low power level until it senses something. When the remote transceiver 62 wakes up, the microprocessor of the transceiver 62 executes a program designed to verify that an animal has been detected and to communicate this fact to the base unit 56.

In one embodiment, the transceiver 62 is programmed to wake up and determine a count of sensor signals. The sensor 66 is designed to repeatedly sense the presence of the animal in the trap 60. Thus, when an animal is present in the trap 60, the animal will repeatedly activate the sensor 66 and wake up the remote transceiver 62. When the transceiver 62 wakes, the transceiver 62 records the fact that an animal has been sensed and the transceiver 62 makes a logical determination of whether animals have been sensed within the recent past, such as within the last hour. If the remote transceiver 62 has a total count of "x" triggers of the sensor 66 (such as three triggers) within the last hour, the remote transceiver 62 will power up its transmitter and transmit to the master base unit 56 its unique serial number. By transmitting the serial number to the master base unit 56, the transceiver 62 is telling the master base unit 56 that an animal has been captured in the trap 60.

In this embodiment, the remote transceiver 62 and the master base unit 56 communicate digitally such that a hand shaking process is first initiated to establish communication between the transceiver 62 and the master base unit 56. Once communication has been established, the serial number of the trap 60 is transmitted to the master base unit 56 and the master base unit 56 transmits the serial number back to the transceiver 62 to indicate that the serial number has been received. Alternatively, the master base unit 56 could transmit a simple message back to the transceiver 62 indicating receipt of the serial number without repeating the serial number. Once the remote transceiver 62 has received confirmation that the master base unit 56 received its message, the transceiver 62 will return to a sleep mode. Thereafter, the remote transceiver 62 will not wake up and will not transmit a signal even when the sensor 66 has been activated by the animal within the trap 60. In this manner, the transceiver 62 maximizes the life of the battery supplying its power and minimizes its power consumption.

The data being transmitted by the system 10 is protected by fail safe procedures and error checking. For example, the remote transceiver, such as transceiver 62, is programmed to keep a log of triggers of the sensor 66 and keep the log for a period of time, even after it has transmitted the information. The master base unit, such as the base unit 56, also keeps a log of events, such as each trigger event, and the log of the base unit 56 is periodically compared to the log of the remote transceiver 62. If the master base unit 56 is missing some data points, it may be updated during the comparison. Likewise the plant computer, such as plant computer 28, keeps a log of events and it is compared to the log of the master base unit 56 and a log maintained by the provider computer. If any log is lacking some of the data it may be updated. The logs of the remote transceivers are routinely purged of older data, and the other logs in the master unit 56, the plant computer 28 and the provider computer 20 may also be purged if desired, but typically the provider computer 20 will keep data for periods of years.

If desired, the remote transceiver 62 can also be programmed to periodically wake up and communicate with the master base unit 56. For example, the transceiver 62 could be programmed to wake up at the same time each day and communicate with the master base unit 56. During such communications, the master base unit 56 can issue additional or different instructions to the remote transceiver 62. For example, the master base unit 56 could instruct the remote transceiver 62 to reset itself so that it will wake up whenever the sensor 66 is tripped and after three "trips", the transceiver 62 will transmit to the master base unit 56 the fact that an animal has been detected in the trap.

In one embodiment, the provider computer 20 may send commands via the internet to the plant computer 28 and the plant computer 28 may reprogram itself and or the base unit 56 based on the commands received from the provider computer 20. For example, the plant computer 28 may reset the clock in the master base unit 56. Or, the provider computer 20 may send the plant computer 28 a message to reprogram a designated remote transceiver, such as transceiver 62. In such case the reprogramming instructions would be sent to the master base unit 56 and the instructions would be held by the base unit 56 until the designated remote transceiver 62 woke up and began talking to the master base unit 56, and at that time the master base unit 56 would send instructions to the remote transceiver 62 causing it to reprogram itself. For example a new time could be sent to the remote transceiver 62, or the behavior of the transceiver 62 could be modified. For example, the time that transceiver 62 routinely wakes up and talks to the plant computer 28 could be modified or the number of triggers of the sensor 66 needed to be interpreted as indicating a trapped animal could be adjusted.

In alternative embodiments where power consumption is less of an issue, the remote transceiver 62 can be programmed to continuously wake up each time the sensor 66 has been activated and record the fact that such sensor 66 has been activated. Then, periodically the remote transceiver 62 can activate its wireless communication and communicate the number of sensor trips to the master base unit 56, along with the date and time of each trip. The count of trips within a given time period in the trap will typically indicate the number of animals within the trap. For example, if a mouse enters the trap 60, he will typically search the trap thoroughly seeking a way out and will trip the sensor 66 over and over within a fairly short period of time. Then, the mouse will typically settle down and the number of trips will be reduced. However, when another mouse enters the trap 60, it will also furiously search for a way out and it will aggravate the mouse that is present. Thus, it will start a new cycle of sensor trips. In general, as more mice enter the trap 60, more activity is recorded. Thus, in a gross way, the number of sensor trips 66 will indicate the number of animals within the trap 60. This type of information may be valuable to the professional pest control company and, thus, the number of sensor trips along with date and time information may be communicated to the master base unit 56.

As the master base unit 56 receives information from the traps 66, 68, 80 and 88, for example, it constantly communicates this information to the plant computer 28. In turn, the plant computer 28 is programmed to constantly provide this information to the provider computer 20 and the provider computer 20 may be programmed to report the information to the professional computer 22, for example, as desired. In addition, the provider computer 20 may inform the professional pest control company of the condition of its traps by sending information other than via the professional computer, such as computer 20, such as by wireless text messaging, instant messaging via the Internet, by e-mail, or by phone call. These options can be selected by the professional pest control company as desired. Typically, a pest control company will prefer to receive only periodic reports as to the condition of its traps, for example, one report an hour is more than sufficient in most cases.

When the pest control company receives the reports at the professional computer 22, for example, the pest control company can make a decision as to what service or maintenance is required at the traps. For example, if only one trap has an animal in it, a decision may be made to send a single person to the plant to that particular trap and dispose of the animal in the trap. Also, the maintenance person would reset the trap and no further maintenance would be required. In a plant with two hundred traps, a great efficiency is achieved because the professional pest control company knows that only one trap has captured an animal and only one trap needs service, especially if the one trap with the animal is known. Since the trap has provided its serial number, the professional knows precisely which trap needs to be serviced and reset.

In a preferred embodiment, the remote transceiver 62 is programmed to respond to a particular type of trigger at the sensor 66 and recognize this particular type of trigger as a reset. For example, the remote transceiver 62 may be programmed to interpret a sensor trip that lasts for three seconds as a reset, and not the detection of an animal. Thus, when the operator arrives to dispose of the animals in the trap, such as the trap 60, he will additionally trigger the sensor 66 for three continuous seconds in order to reset the transceiver 62. Preferably, to allow the maintenance personnel to know when the transceiver 62 has been reset, an illumination device such as an LED lamp is provided on the transceiver 62 to blink while the maintenance person is triggering the sensor 66 and then to glow solidly after three seconds thereby informing the maintenance person that the transceiver 62 has been reset.

Communication between the various components of the system 10 may be encrypted or otherwise made secure if desired. Typically, the communication between the remote transceivers, such as transceiver 62, and the master base unit 56 will not be encrypted and, likewise, the communication between the master base unit 56 and the plant computer 28 will not be encrypted. However, all other communications discussed above typically are encrypted.

Since one of the advantages of the animal control system 10 is to allow the professional pest control company to service the traps efficiently on an as needed basis, it is important that the traps be located in known positions. To accomplish this, the maintenance person will record the position of each trap as those traps are located in the plant.

Figure 3:
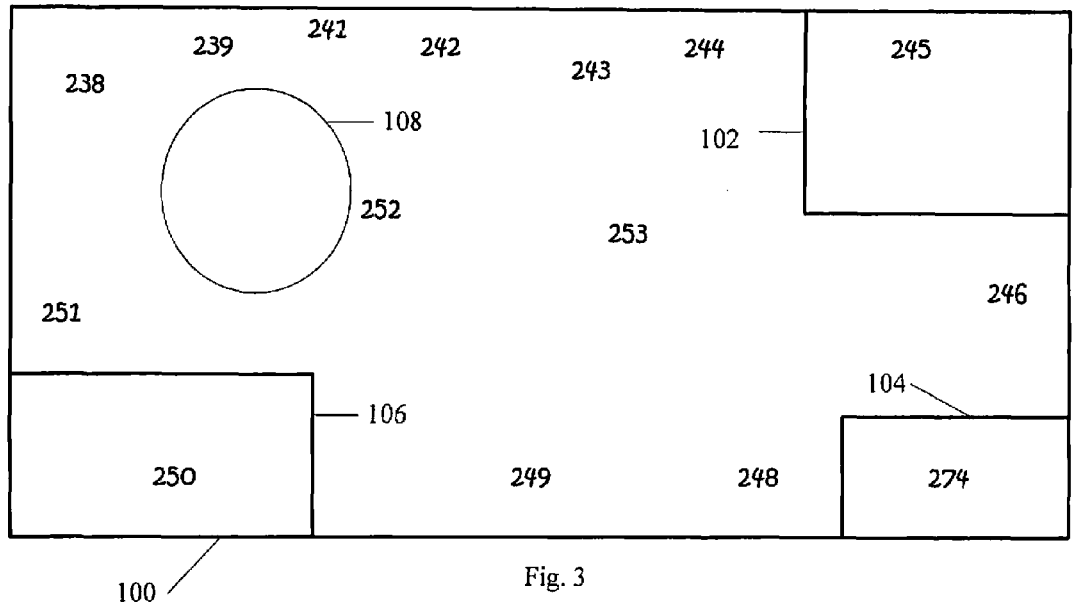
FIG. 3 is a drawing of a plant provided as by a professional positioning of the animal control system traps throughout a plant, with the professional hand writing numbers on the drawing corresponding to serial numbers of the traps and located at locations corresponding to the locations where the professional located each trap.
Figure 4:
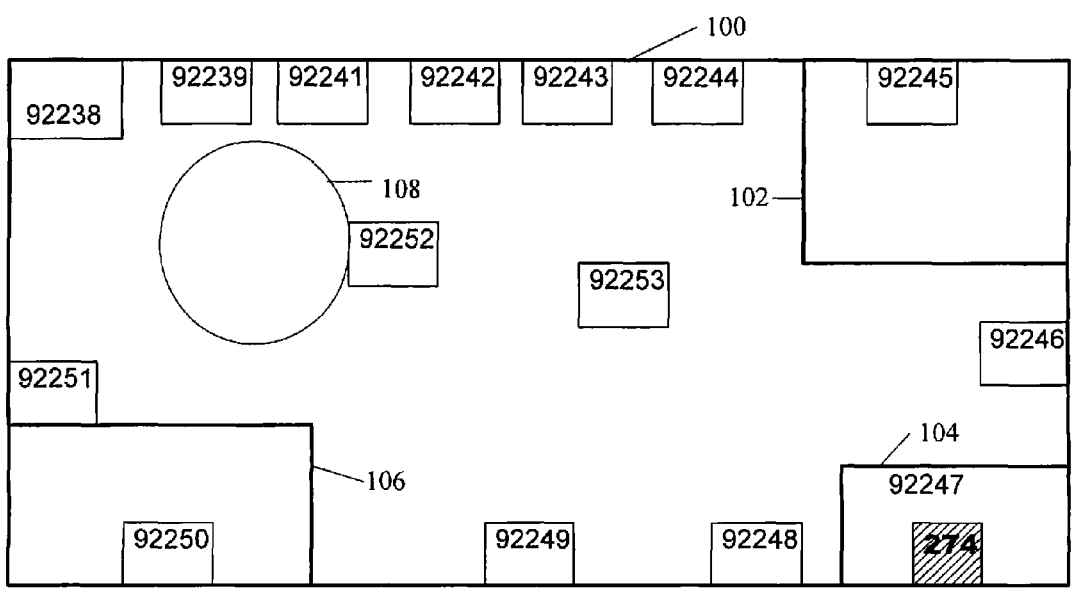
FIG. 4 is a drawing of a plant generated by a computer based on the hand drawn locations of the traps of FIG. 3, with the computer automatically positioning the actual serial numbers of the traps at the actual locations of the traps.

One convenient system for locating the traps in a plant is illustrated in FIG. 3 and FIG. 4, both of which represent layout drawings of a plant. In this particular plant, represented as plant 100, there are three offices 102, 104 and 106 located in three corners of the plant 100. Also, there is a tank 108 located in the upper left portion of the plant drawing. It will be understood that this is a simplified drawing of a plant designed to illustrate the principles of locating the traps within a plant.

Preferably, the maintenance personnel are provided with a drawing of the plant such as shown in FIGS. 3 and 4. However, if no drawing is available, maintenance personnel are trained to accurately sketch the plant layout and such sketches are usually sufficiently accurate for the purpose of locating animal traps. In this particular case, the drawing has been provided of the plant layout. As the maintenance professional positions the traps throughout the plant, he simply hand writes numbers on the drawing, such as shown in FIG. 3, to indicate the location of each trap. For example, the unique serial number for each trap may be provided on the transceiver of each trap in bold font and bar code.

Thus, the professional reads the number from the transceiver (visually or electronically) and writes all or a portion of the number on the layout drawing. In practice, the serial number may have many digits, such as ten digits or sixteen digits, and the maintenance professional is trained that he only needs to record the last three digits of each number on the drawing. Only the last three digits are needed because the transceiver numbers are typically assigned serially so that the last three numbers will uniquely identify each transceiver unless more than one thousand transceivers are used in a particular site. If for some reason the transceivers are not serially issued, and the numbers are more random, it is still probable that only three digits will uniquely identify each transceiver but the professional may write down more digits on the map if desired.

After the maintenance professional writes the numbers on the layout drawing, it may appear as shown that FIG. 3, the numbers 238-253 represent the location of each trap. It should be noted that in the lower right hand corner there is a trap numbered 274 in FIG. 3. The adjacent traps are 246 and 248. In this instance, the maintenance professional has made a mistake. He intended to write down the number 247, but instead he transposed the last two digits and wrote 274. This mistake will be used to illustrate the correction feature of this embodiment. When the maintenance professional returns to his office, the drawing is scanned into the provider computer 20 and optical character recognition software is used to read the drawing and actually read the numbers that have been provided by the maintenance professional.

As the maintenance professional locates each trap in the plant, he also resets each trap. That is, in one embodiment, he holds the sensor in a tripped condition for three seconds until the LED quits flashing and burns constantly. In response to this tripping, the transceiver, such as transceiver 62, recognizes that it is being reset and it transmits its number to the master base unit 56 along with a message that it has been reset. As the maintenance professional repeats this process each time a trap is located within the plant, the master unit 56 is collecting a list of numbers transmitted to it by the remote transceiver. It will be appreciated that the master base unit 56 receives the entire serial number whether it is ten digits or sixteen digits because it is simple for the transceiver to transmit a long number and likewise it is easy for the master base unit 56 to retain those numbers. After all of the traps have been located, the master base unit 56 has a list of all serial numbers of all traps in the plant and this list is constantly being communicated to the plant computer and from the plant computer to the provider computer. Thus, the provider computer 20 is also maintaining a list of all serial numbers of all traps located in a particular plant.

When the drawing provided by the maintenance professional is scanned into the provider computer 20, and the numbers are recognized, the handwritten numbers are matched with the serial numbers that were reported by the master base unit 56. The provider computer 20 performs a best fit analysis on all of the handwritten numbers as compared to the numbers that were provided electronically. For example, the provider computer 20 will first look for serial numbers having the last three or four digits that correspond to each of the handwritten numbers. In this particular example, that first test will uniquely identify all but one of the handwritten numbers with a serial number. Thus, the computer is able to automatically position the actual serial numbers on the layout drawing as shown in FIG. 4.

However, as mentioned, the maintenance professional made a mistake in writing down the number 274. In this case, the provider computer 20 has recognized that mistake and has shown the trap 274 in the lower right hand corner with bold numbers and hatching to indicate that the trap 274 is a mistake. Immediately above the box representing 274, the number 92247 has been written to indicate the computer's suggestion as to the best fit for this particular trap. In this simple example, since only one mistake was made, it was easy to match the number 92247 to the handwritten number "274". However, if numerous mistakes have been made, the provider computer 20 will use a more rigorous examination in order to find the best fit.

Suppose, for example, that the provider computer 20 has positively identified trap numbers with the handwritten numbers in all but three cases. The provider computer 20 will then know that the remaining three handwritten numbers must correspond to the remaining three serial numbers. To make a positive identification, the provider computer 20 will execute a series of tests to find the best fit. For example, the provider computer 20 could look for transposed numbers in the last "x" number of digits by summing the last "x" digits. In this case, the provider computer 20 could sum the last three digits of 92247 and it would calculate a total of 2 plus 4 plus 7 equals 13. When it calculated the sum of the handwritten number "274", it would reach the same sum, namely, 13. Thus, this particular test would indicate a possible match between the handwritten number and the serial number.

To further test for the best fit, the program could begin a process of transposing numbers in either the serial number or the handwritten number. For example, in this case, the provider computer 20 could transpose the first two numbers in 274 and change the handwritten number to 724. That would not match anything. It could then transpose the second two numbers in 274 to create 247 which would be an identical match to the last three digits to 92247. Thus, the provider computer 20 has found another best fit using a different technique. By using multiple best fit techniques, the computer will ultimately suggest best fits for each of the three erroneous numbers.

Referring again to FIG. 4, the human operator of the provider computer 20 can quickly glance at FIG. 4 and see that one mistake has apparently been made. The operator could look at the suggested number and see that numbers have been transposed and that the handwritten number was out of order. In other words, 274 does not fit between 92246 and 92248. Thus, the operator would quickly see that the numbers have been transposed and could click on the suggested number to accept it. Then, the provider computer 20 would substitute the number 92247 for the number 274 and un-hatch the block so that it would indicate an accepted serial number for that particular trap. In addition, the user could spot check or otherwise verify every other trap serial number against the handwritten number to verify that the provider computer 20 has properly located the various traps on the layout drawing.

Figure 5:
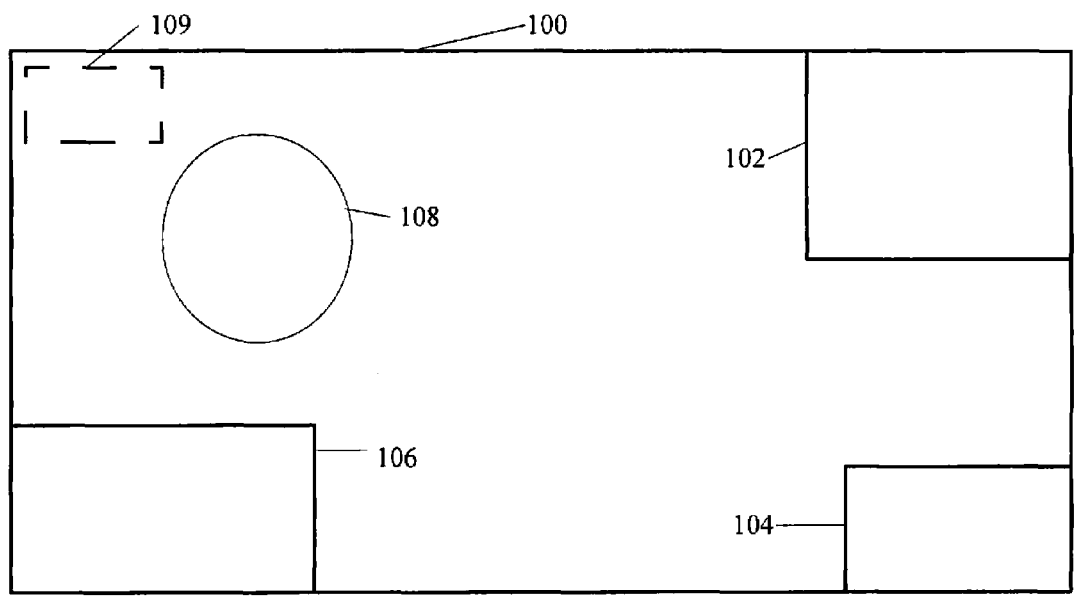
FIG. 5 is a computer generated drawing providing a listing of the known serial numbers of the traps located in a plant and a blank drawing of the plant.

In a more simplistic alternate embodiment, the provider computer 20 could provide a listing of the known serial numbers located in a plant and a blank drawing of the plant as shown in FIG. 5. The operator could then view the handwritten paper drawing of the plant and drag and drop each of the serial numbers to the appropriate location in FIG. 5. For example, in the upper left hand corner of the serial numbers, there is shown a number 92238. The operator could find on the handwritten map the number 238 in the upper left hand corner of FIG. 3. The operator would then know to drag and drop the box labeled as 92238 to the position 109 shown in FIG. 5. By repeating this process, the operator could quickly drag and drop each of the serial numbers to the appropriate location in the layout drawing.

It will be appreciated that the systems according to the disclosure allow the electronic transfer of the actual serial numbers from the remote transceivers such as transceivers 62, 70, 84 and 92, to the provider computer 20. By providing this electronic transfer of numbers, the maintenance professional has eliminated many possible sources of errors, has reduced the burden on the maintenance professional when installing the traps and has provided a check on the accuracy of the layout drawing that is created by the maintenance professional. In other words, if the maintenance professional makes a mistake in writing down a number, the mistake can be caught and easily corrected, possibly automatically corrected by the computer itself without much intervention by an operator.

Figure 6:
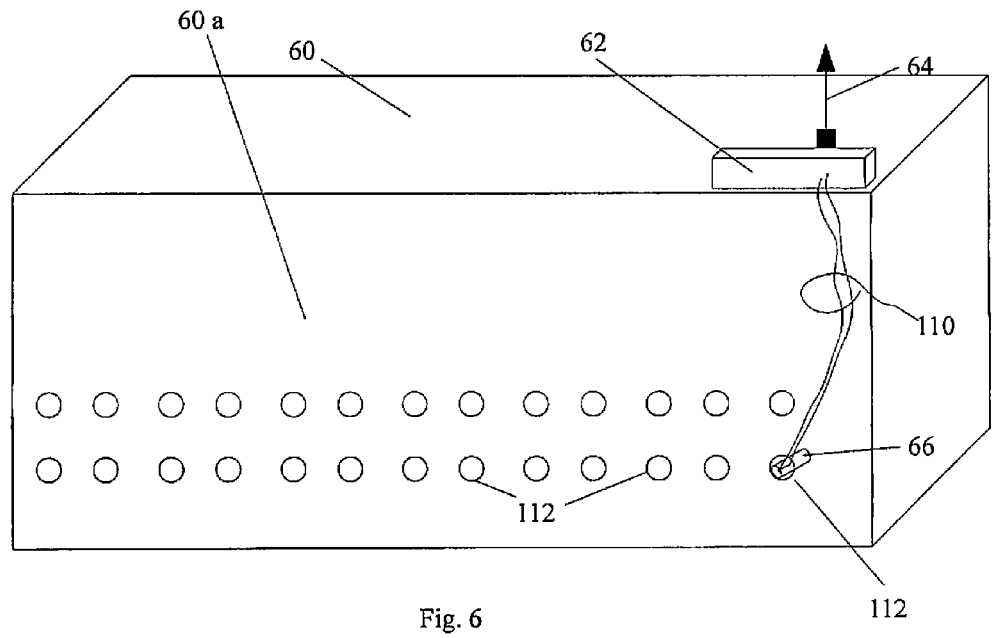
FIG. 6 is a drawing of a trap utilized in animal control systems according to the disclosure.

Referring now to FIG. 6, there is shown a more detailed view of one embodiment of the trap 60, the transceiver 62 and the antenna 64. In FIG. 6, the relative sizes of the trap 60 and the transceiver 62 are more realistic than in FIG. 2, but it will be understood that this illustration is again not to scale and the sizes of elements have been modified for purposes of clarity. In this particular embodiment, the trap 60 is a rectangular cage that includes breathing holes 112. Preferably, the cage is constructed of metal, such as galvanized steel, and breathing holes are approximately ¼ of an inch in diameter such that there is no chance that the animals within could escape through the holes. The transceiver 62 is connected to the sensor 66 by wires 110 and the sensor 66 is mounted in hole 112 extending into the trap 60. In this particular embodiment, the wires 110 are disposed on the outside of the trap 60 and are therefore inaccessible to animals within the trap 60 because the animals inside a trap would probably chew the wires. In alternative embodiments, the wires 110 could extend within the trap 60 and be covered by durable sheath, such as a small steel tube acting as a conduit. In another embodiment, the sensor 66 could be connected directly to the transceiver 62 and the transceiver 62 could be mounted on the outside of the trap adjacent to one of the holes 112 so that the sensor 66 could extend through the hole 112.

Figure 7:
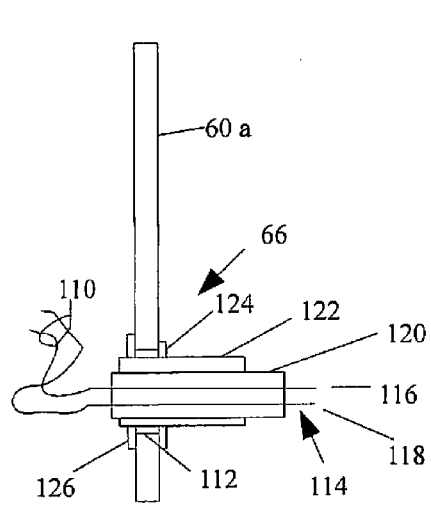
FIG. 7 shows an animal sensor utilized in the trap of FIG. 6 to sense the presence of an animal in the trap.

Referring to FIG. 7, one embodiment of the sensor 66 is shown. In this embodiment, the sensor 66 has a tubular shape and it extends into the trap 60 for approximately three quarters of an inch. The length dimension of the sensor 66 is not critical so long as it is sufficiently penetrating into the trap 60. It is also important that the sensor 66 be positioned low enough that the animals in the trap 60 will have an opportunity to contact the sensor. The connecting wires 110 are attached to a pair of conductors 114 that extend from outside of the trap 60 to an exposed position within the trap 60. The conductors 114 are made of a strong stiff material such as a high grade stainless steel. This material should be sufficiently strong to resist any kind of bending forces that a large rodent or animal could apply to the steel even with their jaws. The ends of the conductors 114 include round tips 116 and 118 that are designed to encourage animals to contact the tips of the conductors 114. A sharp tip might be instinctively avoided by an animal.

On the inside of the trap, the conductors 114 extend out of a plastic insulation material 120. The insulation material 120 is typically a hard rubber or plastic that will be resistant to chewing by a rodent, but is sufficiently attractive to a rodent to cause it to try to chew the material. The insulating material 120 is protected by a steel sheath 122 and the steel sheath 122 is mounted to the wall of the trap 60 as by fasteners 124 and 126. For example, the fasteners 124 and 126 could be threadedly secured to the steel sheath 122 and thus, the fasteners 124 and 126 can be threadedly tightened to firmly secure the sensor 66 in place on the wall of trap 60.

When an animal, such as a mouse, enters the trap 60, it typically follows the walls of the trap 60 searching for a way out of the trap 60. As it circles around adjacent the wall, it will encounter the protruding sensor 66. It will instinctively investigate and will probably rub its nose or body against the tips 116 and 118. It will also probably attempt to chew the probes 116 and 118 or it will attempt to chew the plastic or rubber insulation 120. In either event, it will cause a short circuit (a resistive path having greater conductivity than air) across the conductors 114 and the transceiver 62 is equipped a resistance sensor that will immediately sense the dramatic shift in the resistance across the conductors when a mouse even brushes against it. The conductivity of air between the conductors at low voltage is for practical purposes infinite. Thus, even the slightest bit of conductivity between the conductors 114 created by a mouse will be easily detected by the resistance meter in the transceiver 62. When the resistance meter detects a short or a dramatic reduction in the resistance between the wires 110, it generates a signal intended to wake up the transceiver 62 and indicate that the sensor 66 has been triggered.

Figure 8:
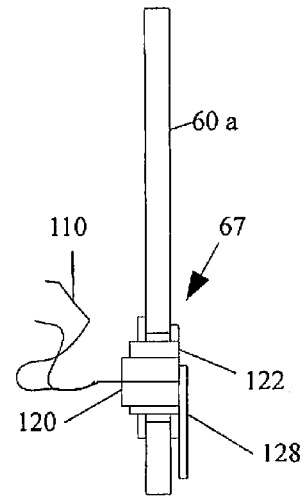
FIGS. 8-12 show various alternate embodiments of an animal sensor for use in systems according to the disclosure.

An alternate embodiment of the sensor 66 is shown in FIG. 8 as sensor 67. In this embodiment, the sensor 67 is mounted almost flush against the inside wall of the trap 60. Again, the wires 110 extend through an insulating tube 120 and then extend down along a frame 128 in a position exposed to the animals within the trap 60. As before, the sensor 67 is mounted to a wall 60*a* of the trap 60 by a metal sheath 122 that surrounds the insulated tube 120 and by fasteners 124 and 126.

Figure 9:
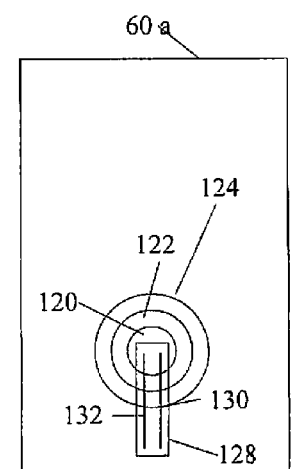

Referring to FIG. 9, a view of the frame 128 is shown from within the trap 60. In this view, one appreciates that the frame 128 has a generally rectangular shape and extends downwardly almost to a bottom 134 of the trap 60. Two separated steel conductors 130 and 132 extend down the exterior face of the frame 128 and are exposed for contact with animals inside the trap 60. The steel conductors 130 and 132 are connected to the wires 110, and again the animal within the trap 60 has access to the conductors 130 and 132 and will create a short (a resistive path having greater conductivity than air) between the conductors 130 and 132. In this particular embodiment, a rodent, such as a mouse, will typically brush against the conductors 130 and 132 as it follows the wall of the trap 60 trying to find an exit. As it brushes against the conductors 130 and 132, it will short the circuit which will be detected by the resistance sensor in the transceiver 62 and will be interpreted as a trigger signal indicating the presence of an animal. In addition, the frame 128 is constructed of a highly durable hard plastic or rubber that is attractive to rodents for chewing but is sufficiently hard to resist any significant damage caused by chewing. Likewise, the steel conductors 130 and 132 are sufficiently hard and strong to resist any significant damage by chewing. Thus, the rodent will typically attempt to chew the frame 128 and the conductors 130 and 132. During the chewing process, the rodent will inevitably create a short between the conductors 130 and 132 thereby triggering the sensor 66.

In both of these sensors, the activity of a rodent has been recognized and taken advantage of to simplify the mounting of the sensor within the trap 60. It is not necessary to cover the entire trap or to cover any particular point in the trap in order to detect the presence of an animal. Its basic instinct to escape will cause any animal, particularly rodents, to investigate the entire area of the trap and thereby encounter the sensor. Thus, the job of finding an appropriate location for the sensor is greatly simplified. In fact, the sensor can be attached directly to the transceiver 62 and the transceiver could be mounted to the side of the trap such that the sensor and trap may be conveniently located almost anywhere along the trap so long as the sensor is sufficiently close to the bottom 134 of the trap 60 to ensure that all rodents big or small have an opportunity to trigger the sensor 66 and 67.

Figure 10:
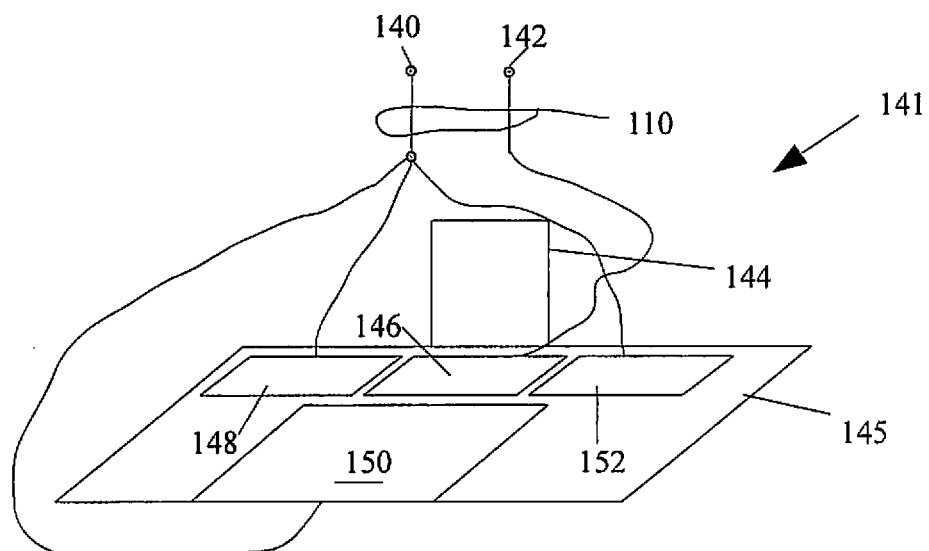

Referring now to FIG. 10, there is shown another sensor system 141 for sensing the presence of animals within a trap, such as the trap 60. FIG. 10 shows the wires 110 terminating at junctions 140 and 142. The junctions 140 and 142 represent connections to the transceiver 62. In FIG. 10, the walls of the trap 60 have been removed showing only a floor 145 of the trap and a door 144 representing the entry point of the animal into the trap. As the animal enters the trap, it crosses a conductive pad 146 positioned on the floor 145 of the trap. As the animal moves away from the pad 146, it will step on another pad 148, 150 or 152 while it is still in contact with pad 146. The pad 146 is connected to the terminal 142 and the other three pads 148, 150 and 152 are connected to terminal 140. Thus, when the animal steps from the pad 146 onto any of the other pads, a short is created between the terminals 140 and 142, and such short is interpreted by the transceiver 62 as it measures the resistance across the terminals. When the resistance changes from infinity to some measurable amount of resistance, the transceiver 62 interprets such change in resistance as a trigger caused by an animal. As the animal wanders about the trap 60, it will repetitively step on pad 146 and one of the other pads 148, 150 and 152 and repetitively trip the sensor in a manner similar as that described above.

Figure 11:
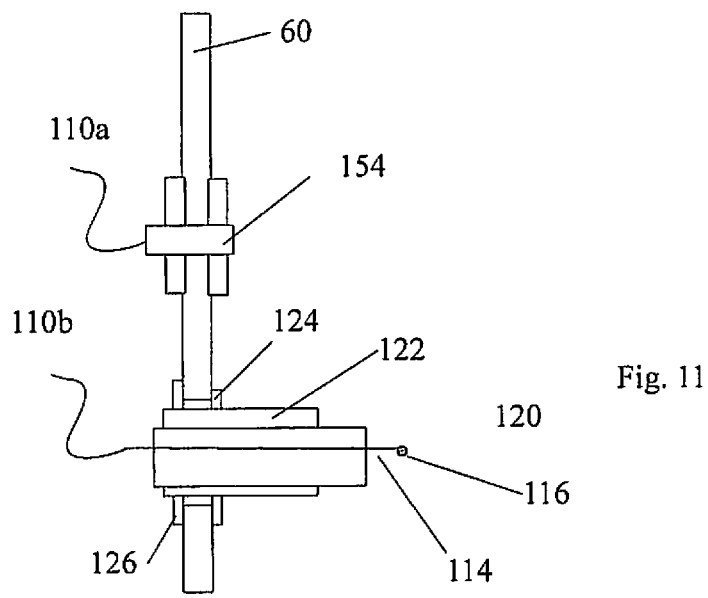

Referring to FIG. 11, an alternate embodiment of a conductive sensor is shown. In this embodiment, a wire 110*a* is connected to a contact 154 which places the wire 110*a* in electrical contact with the metal cage 60. Another wire 110*b* is connected to a steel conductor 114 that extends through an insulated tube 120 and terminates at a rounded tip 116. This construction is similar to that disclosed in FIG. 7, except that only one conductor 114 extends through the insulator 120. When the animal touches the conductor 114 or the tip 116, a short is formed between the conductor 114 and the metal trap 60. Since the wire 110*a* is connected to the trap 60, the short will be detected by the transceiver as a trigger signal. Thus, when a mouse or other rodent that is standing on the metal floor 145 of the trap 60 touches the conductor 114, a trip signal will be generated and reported by the transceiver 62.

Figure 12:
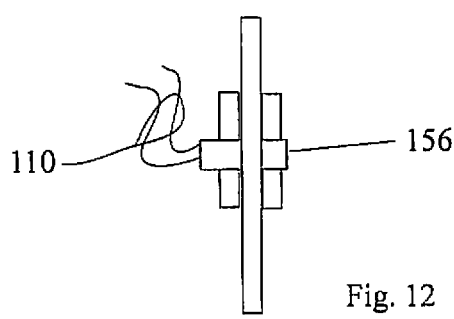

FIG. 12 represents multiple other signals that could be used in connection with the present embodiments. For example, a sensor 156 shown in FIG. 12 can represent a diffuse light sensor that transmits a diffuse light, preferably in a frequency range that cannot be observed by humans or rodents. For example, ultraviolet or infrared light is not visible to either rodents or humans. By transmitting ultraviolet light and receiving the backscatter, the sensor 156 detects when is normal in a non-occupied trap. When a rodent or mouse appears in front of the sensor 156, the backscatter created by the mouse is detected as a change in the overall amount of backscatter by the sensor 156. Thus, a mouse in close proximity to the sensor 156 will cause a trip signal.

In a similar manner, the sensor 156 may be an ultrasonic sensor that generates and transmits an ultrasonic signal and listens for a return echo. When the trap is empty, one type of echo will be received. When one or more animals are in the trap, the return signal or echo will change and the changed signal will be interpreted as a trigger indicating the presence of an animal.

Figure 13:
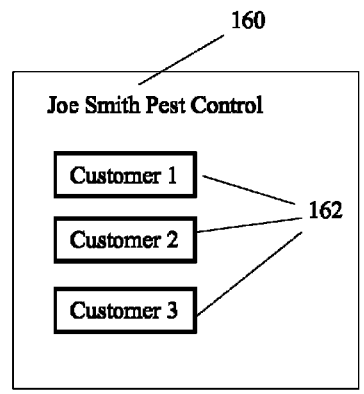
FIGS. 13-19 show aspects of computer operation of animal control systems according to the disclosure.
Figure 14:
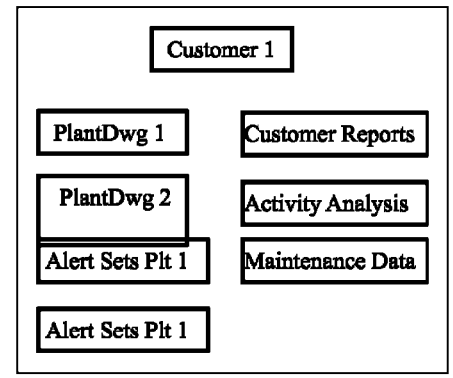

Referring now to FIG. 13, the program that operates on the provider computer 20 will be described in pertinent detail. The provider computer 20 first allows the operator to select one of its pest control professionals. For example, the operator might select from a list (not shown) the name "Joe Smith Pest Control", and a screen like that shown in FIG. 13 would be presented showing the name "Joe Smith Pest Control" at 160 and identifying three customers 162 of this company. The operator may then select one of the customers of Joe Smith Pest Control, and such selection is indicated in FIG. 14 showing that Customer 1 has been selected. In this view, the operator may click on any of the indicated boxes and select either a drawing of one of the customer's plants or alarm settings for the plant or customer reports. Also, boxes are provided for selecting activity analysis and maintenance data.

Figure 15:
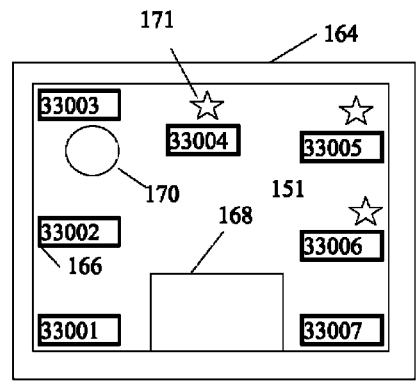

If the operator selects a box entitled plant drawing one (PltDwg1), the provider computer 20 will display a screen such as that shown in FIG. 15. In this figure, a simplified drawing of a plant is represented. The plant perimeter is indicated by line 164. Each of the traps in the plant is represented by a box, such as box 166 indicating the unique number of that trap. In this simplified drawing, a lobby 168 is represented along with a tank 170. In reality, a plant would be much more complicated and larger than this drawing, but this particular drawing is simplified for purposes of illustration. In this drawing, the unique serial numbers of the trap range from 33001 to 33007. The current status of each trap is indicated by the presence or absence of a star, such as star 171 shown above trap 33006. Thus, the drawing of FIG. 15 is indicating that traps 33004, 33005 and 33006 have currently detected the presence of an animal in the trap. The remaining traps have not detected animals.

Figure 16:
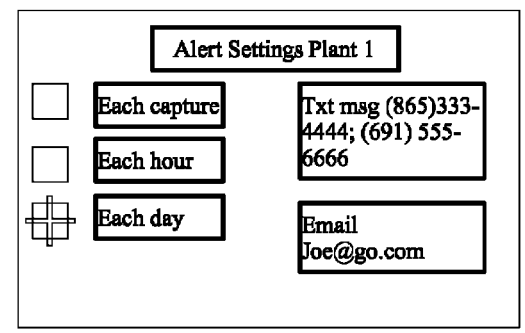

Returning to FIG. 14 and with additional reference to FIG. 16, the operator may also set alarms for each of the plants. If the Alert Sets Plt 1 box (alert sets plant one box) is depressed as shown in FIG. 14, then a screen such as that shown in FIG. 16 is presented. In this screen, the user may select the frequency with which the maintenance professional is alerted to the presence of an animal in a trap. For example, the user may elect to be alerted each time any trap captures an animal by checking the box next to "each capture". Likewise, if the box "each hour" is checked, the system will send out alerts only once an hour at a time selected by the user. In this particular case, the user has selected each day by placing an X in the box by clicking on the box next to "each day". In this case, the user will receive an alert message once a day at a selected time. For example, the user might select 8 a.m. as the time for being alerted.

The user may also select the type of alerts it would like to receive. In this particular case, the user has selected the option of receiving text messages at two different phones and it has also selected the option of receiving an e-mail at the address of "joe@go.com". While text messages and e-mail are preferred by this particular customer, the system will also allow the selection of alerts to be sent by instant messaging over the computer, voice telephone calls, messages placed on computer boards and the like. The alerts that are sent to the customer will indicate the identity of the plant where animals have been captured and the serial number of each trap containing an animal. If desired, the message may also provide additional information such as the time at which the animal was captured and the estimated number of animals that were captured in the trap.

Figure 17:
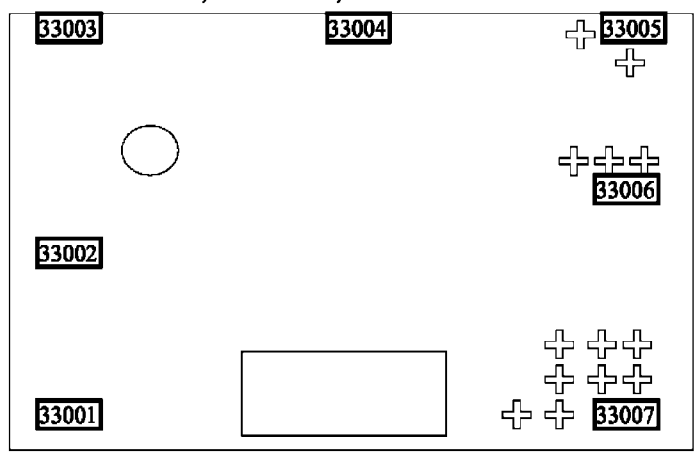

If the user selects activity analysis as shown in FIG. 14, the user will be presented with a screen allowing it to choose a time period for which the analysis is desired. In the example shown in FIG. 17, the user has selected plant one and desires an analysis extending from Jan. 1, 2010 to Feb. 15, 2010. In response, the computer has generated a graphical image of plant one and has placed crosses by the plant traps that have captured animals during the selected period of time and the number of crosses indicates the number of captures at each trap. In this case, trap 33005 has made two captures, trap 33006 has made three captures, and trap 33007 has made eight captures. This graphical display allows the maintenance professional to quickly see which traps are most active and therefore understand where correction or some type of repair measures should be taken to prevent the entry of animals into the plant.

Figure 18:
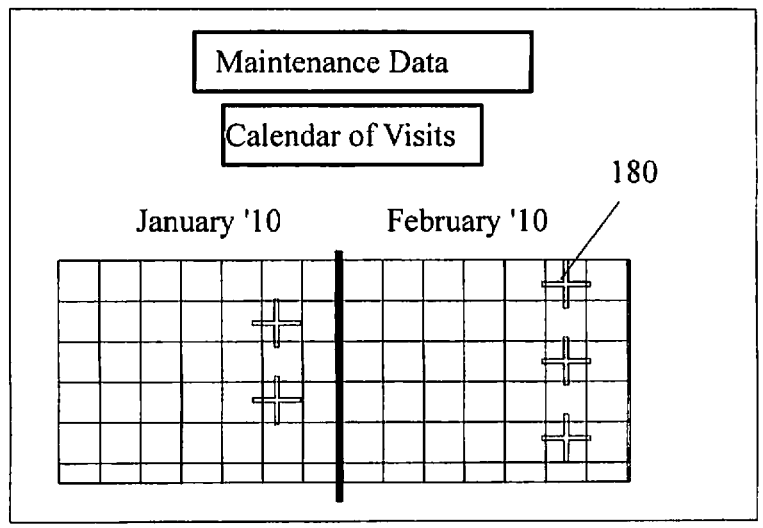
Figure 19:
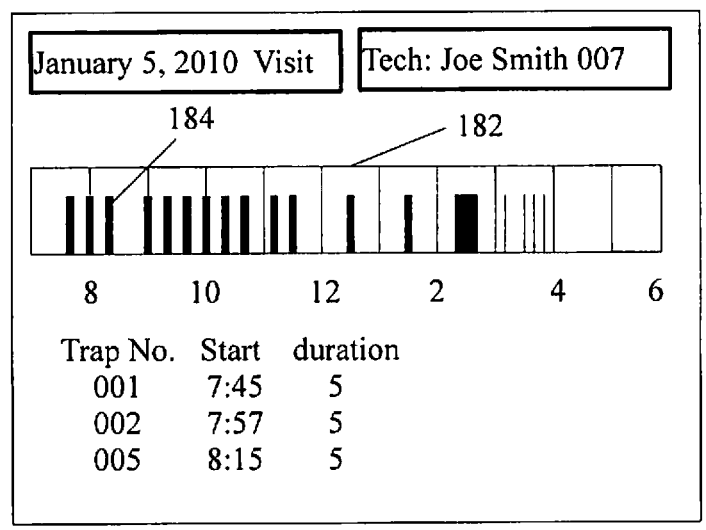

If the user selects maintenance data in the screen shown in FIG. 14, the views shown in FIG. 18 and FIG. 19 become available. First, the view in FIG. 18 shows a calendar of visits for the selected plant. In this case, the user has selected plant one and has selected January and February on the calendar. In this case, it shows that the traps in plant one have been inspected basically every other week throughout January and February as indicated by the crosses 180 on the calendar. The user can then click on one of proscribed indicia, such as one of a number of crosses 180 to receive additional information about the visit to the plant on that particular date.

Referring to FIG. 19, a screen shot is shown indicating the details of the visit to the plant on Jan. 5, 2010. This screen shot was obtained by clicking on Jan. 5, 2010 in the screen shown in FIG. 18. FIG. 19 first indicates that the technician or maintenance professional for this particular day and this particular plant was a person named "Joe Smith" having the identification number of "007". When Joe visited the plant, he visited all of the traps that needed attention. He knew which traps needed attention based on the drawing shown in FIG. 17. This drawing may be printed and taken with the technician to the plant, or the technician may view the drawing on an electronic device such as a PDA or a laptop computer.

In FIG. 19, the activity of the tech is shown both graphically and numerically. At the top middle of the screen, a graph 182 is shown with bars 184 indicating the duration of a visit at a particular trap. It also indicates the time along the bottom of the graph. In this instance, the graph starts at 8 a.m. and continues to 6 p.m. The width of the bar 184 indicates how long the technician spent at each trap. It will be recalled that the technician is instructed to trip the sensor of the trap when he first begins the process of maintaining the trap and perhaps cleaning the trap. When he is finished, he will trip the sensor again and the software will interpret the two quick trips of the sensor of a particular trap to mean that it was cleaned or maintained starting with the first trip and ending with the second trip.

In the graph shown in FIG. 19, the bars indicate eleven traps were cleaned between 7 a.m. and 12 p.m. on January 5. The duration of the cleaning in each case was five minutes which is indicated by the consistent width of the bars on the graph. After 12 p.m. the graph indicates that seven traps were cleaned. Between 12 p.m. and 1 p.m., a single trap was cleaned and it took approximately five minutes, between 1 p.m. and 2 p.m., another single trap was cleaned and again it took about five minutes. Between 2 p.m. and 3 p.m., a single trap was cleaned and that cleaning took about thirty minutes. Then between 3 p.m. and 4 p.m., the very thin bars indicate that four traps were cleaned and each cleaning took less than a minute.

The program will indicate a very thin bar as shown between 3 p.m. and 4 p.m. when the sensor is tripped only once during the cleaning process. So, in this case, it appears that the technician became hurried about 3 p.m. and began servicing the traps quickly and forgot to trip the sensor twice during the cleaning process. The small number of traps that were cleaned during the time period from 12 p.m. to 2 a.m. indicates that something odd was taking place. Perhaps the maintenance person was distracted by something else occurring at the plant.

The extremely long duration of the cleaning process between hours 2 p.m. and 3 p.m. indicates, again, that something unusual took place. In this case, perhaps it was necessary to perform extensive maintenance on a trap. Likewise, the relatively large number of traps that were visited between 3 p.m. and 4 p.m. and the short duration of those visits also raises concern. This graph quickly tells the operator in a form easy to interpret whether the visit to the plant was routine or unusual. When unusual events are detected using the graph, the data may be studied more rigorously or an inquiry may be sent to the technician for an explanation. This information serves two purposes. One, it fully informs the operator of exactly what type of maintenance is being performed on the traps and, by sending an inquiry to the technician, the technician understands that his performance is being monitored.

At the bottom of the page, the inspection or cleaning of the traps is indicated by a list identifying each trap that was cleaned or inspected and indicating the starting time of the inspection and the duration of the inspection. The ending time of the inspection is not needed, but it could also be displayed if desired. If the trap was tripped only once during an inspection, the list as shown at the bottom of FIG. 19 will indicate a duration of an asterisk ("*") indicating that a trap sensor was tripped, but only once. The computer realizes that the trap was triggered only once because it received a signal from another trap indicating the start of another cleaning process. The computer is also programmed to interpret many hits in a short period as a cleaning process. If there were an unusually high number of actual animal trappings, the program might be fooled, but the data will be retained and an operator can correct the interpretation manually. If the operator sees that traps were cleaned at 3 a.m. in the morning and he knows that the traps were not inspected at that time, he can override the interpretation and instruct the program to record the data as animal traps.

Besides testing or judging the frequency of sensor signals, the program can be set to use a variety of tests to determine the difference between cleanings. For example, the computer can be programmed to interpret 3 second trips to be cleaning only. If a trap has a high number of trips in a short period of time, that test would indicate the presence of an animal and not a cleaning even if the animal is tripping the sensor for 3 seconds at a time. If the trips are occurring at unusual hours for a cleaning, such as late at night or early in the morning (e.g. 3 a.m.) that test would tend to indicate the trips were caused by animals. Likewise, trappings in the middle of the daylight hours inside an active plant would indicate cleaning as opposed to animal trappings. In short, an animal trapping procedure and a cleaning procedure each create a different pattern of trips and each has unique characteristics or tendencies. By employing numerous tests on the detected characteristics, and weighing these tests, the computer can quickly distinguish between the two. The tests can be customized for a particular plant. For example if the traps are normally cleaned at night in a particular plant, the time of day test would need to be eliminated or corrected for this plant.

In one particular embodiment, cleanings are identified whenever a single trap is triggered twice for 3 seconds within a specified period of time, for example, within 15 minutes of each other. This assumes that a trap will not usually capture two animals within a 15 minute period and the animal will not trip the sensor for 3 continuous seconds each time. The user may adjust the duration of time used in this analysis as desired.

Figure 20:
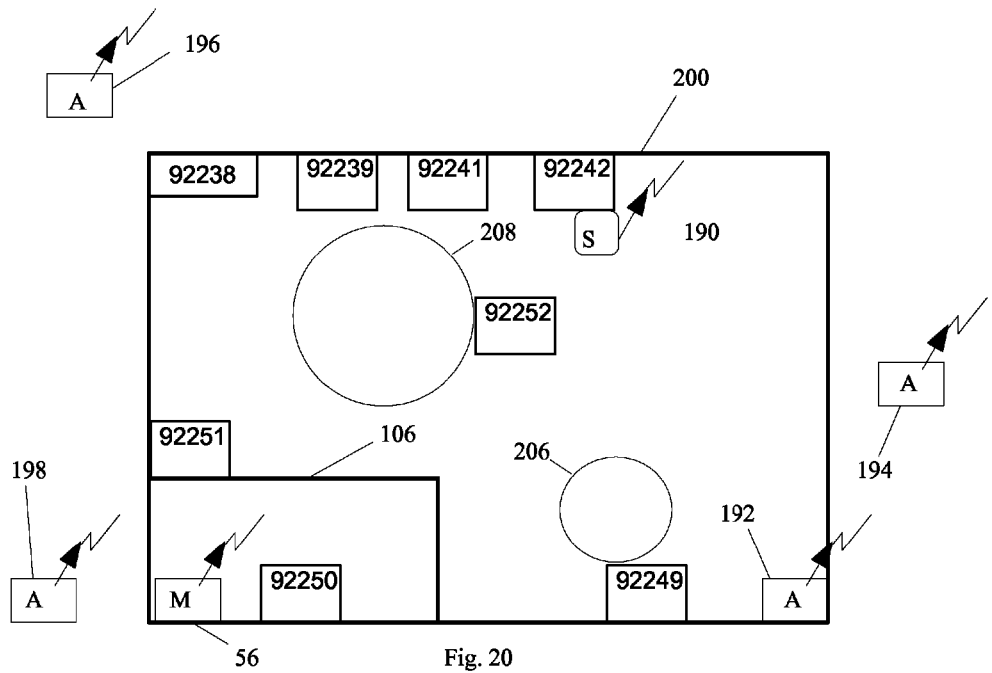
FIGS. 20 and 21 show aspects of an alternate apparatus and method for locating traps according the disclosure.

Referring now to FIG. 20 an alternate apparatus and method for locating rodent traps 92238-92251 is illustrated. The rodent traps are located in a warehouse 200 shown in plan view, and in this simplified warehouse, a tank 208 and office 206 are shown along with the rodent traps. In this embodiment, a set up unit 190 is used to locate the traps as they are installed. The setup unit 190 is a microprocessor based radio transceiver. It may be a specially designed dedicated device or it can be a smartphone that has been specially programmed to perform the functions set forth hereinafter. Preferably, but not as a requirement, the setup unit 190 includes a large sensitive GPS antenna designed to allow it to function inside. Thus, the setup unit 190 can determine its position using WAAS GPS. Typically this type of GPS location is accurate to within 1 meter horizontally which is more than sufficient for location rodent traps.

In addition to using GPS location technology, the setup unit 190 is preferably provided with supplemental back-up or verification technology. For example, the setup unit 190 may include wireless location technology provided by "Sky Hook Wireless". This technology uses any number of other radio transmitters to supplement GPS location and, the other radio transmitters can be used as the primary location device if the GPS signal is not obtainable. For example, the Sky Hook Wireless technology utilizes transmission signals from cell phone towers and wireless wifi hot spots. The Sky Hook Wireless database includes the precise location of the various other radio transmitters, such as cell towers and wireless wifi hot spots, and the setup unit 190 detects the direction to those towers and triangulates its position based on a number of different directions to a number of different radio transmitters.

In this embodiment, the setup unit 190 may be used to first position a number of auxiliary radio transmitters and incorporate them into a database identifying their exact location. Once those transmitters have been located in the database, or in the unit 190 itself, those transmitters can be used to further locate the setup unit 190. For example, in this particular embodiment, the setup unit 190 has been used to locate auxiliary transmitters 194, 196 and 198. These transmitters are located immediately outside of the warehouse 200 and have been accurately located by the setup unit 190 because a clear and open signal has been received from satellites to locate the auxiliary transmitters using GPS enhanced by WAAS.

Once the transmitters 196, 198 and 194 are precisely located, the setup unit 190 records those precise locations, latitude and longitude, within the unit and begins to use the locations of those transmitters to supplement, verify or substitute for GPS location. Operating within the warehouse 200, if the GPS signal continues to be available, and it will be in most warehouses, the setup unit 190 continues to use GPS supplemented by the auxiliary transmitters and any other transmitter that has an exact known location and is being received by the setup unit 190.

Inside the warehouse 200, the master unit 56 is precisely located using the setup unit 190 and, since it is also a radio transmitter, it may be used to supplement the location accuracy of the setup unit 190. Most preferably, the master unit 56 is located in a position that is easily recognized within the building. For example, in this case, it is located within an office 206 in the warehouse 200, and it is located in the corner of the office 206 which also happens to be the corner of the warehouse 200. A second auxiliary transmitter 192 is also precisely located using the setup unit 190 and the auxiliary transmitter 192 is located in the right hand corner of the warehouse 100. Each of the transmitters 56, 192, 198 transmits a unique identification number with its signal so that the setup unit 190 can accurately identify which unit is sending a particular signal that is being detected. Each of the bait stations, such as 92242 are also transceivers with unique serial numbers and theoretically they could be used as part of auxiliary location system as well, but since they transmit for only very short periods of time, they have been excluded in this particular embodiment from the auxiliary positioning system used by setup unit 190.

To locate a particular transmitter, such as the transmitter 192, the setup unit 190 and the transmitter 192 are located in substantially the same position. The setup unit 190 is allowed to settle until it gives a consistent readout indicating that it has acquired sufficient electronic signals to accurately position itself to within approximately 1 meter. After the setup unit 190 has accurately located its position, the unit 190 is turned on and allowed to transmit. The setup unit 190 will receive the new signal and recognize it as a new signal. In response, it will automatically display the unique serial number of the new transmitter and ask the user whether this transmitter should be entered into the auxiliary positioning system. If the user answers yes, the exact position of the transmitter 192 is entered into the memory of setup unit 190 and will be used thereafter to help position the unit 190.

In addition, the unit 190 will transmit the unique serial number of the transmitter 192 back to the master unit 56 where the location and identity of the transmitter 192 will be stored as well. In addition, this same information may be transmitted back to the Sky Hook Wireless database, if desired, and it is transmitted back to the provider computer 20 as in the manner previously described. That is, the master unit 56 will transmit the information back to the provider computer 20. Once the various transmitters have been located, the accuracy of the setup unit 190 will be more than sufficient for purposes of locating the traps. In addition, if the GPS signal is weak within any building, the auxiliary signals will be sufficiently strong to provide accurate positioning information to the setup unit 190. Thus, the setup unit 190 can function with or without receiving a reliable GPS signal.

To set up a trap, such as the trap having the serial number 92242, the setup unit 190 and the trap are located in approximately the same exact position. The trap 92242 is then triggered by the user causing it to begin transmission. One of the items transmitted is the unique serial number of the trap. The setup unit 190 will recognize that it is receiving a new signal, will recognize it, and setup unit 190 will establish communications. It will receive the serial number from the trap 92242 and it will ask the user whether this serial number should be recorded at this particular location. If the user responds "yes", the serial number and location are recorded and transmitted to the master unit 56 and from the master unit 56 back to the provider computer 20. In this manner, each of the traps may be precisely located within a plant using latitude and longitude information. The setup unit 190 is moved from trap to trap and it is used to quickly acquire both the location and the unique serial number of each trap as each trap is positioned throughout the warehouse 100.

Once all of the traps have been located, the exact location of all traps will be known by the setup computer 20 and the computer 20 is programmed to display a screen such as that shown in FIG. 20. In this screen, all of the traps and transmitters are located on the screen relative to one another, but the building is yet to be located. If a drawing of the building is available with the exact locations of various features of the building known, then the building can be simply superimposed on the traps and transmitters shown in FIG. 20. However, if such drawing is not available, other techniques may be used to locate the building and the building features on the display of FIG. 20. In this particular embodiment, a scale drawing 200a is available showing the warehouse 200 (FIG. 21).

Figure 21:
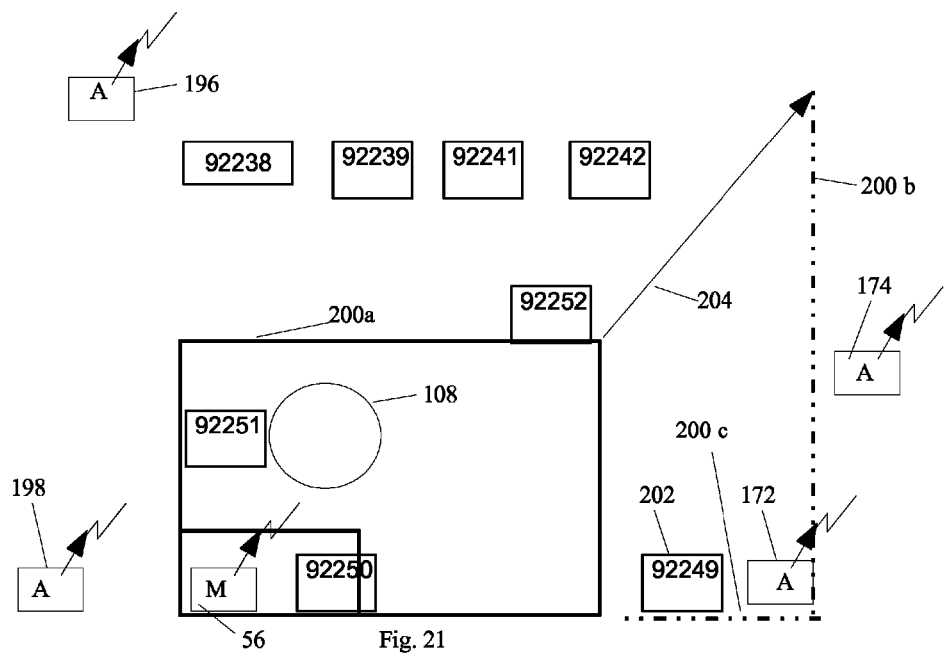

As shown in FIG. 21, the scale of warehouse drawing 200a is considerably less than the scale being used to display the traps. Thus, the size or scale of the drawing 200a must be expanded as indicated by arrow 204. Using the cursor, the operator may grab the corner of the drawing 200a and drag it diagonally to coincide with the dashed lines 200b and 200c. At that point, the corner of the drawing 200a will just fit around the transmitter 192 shown in FIG. 20, and the left corner will just fit around the master unit 56. By using any two reference points, the scaled drawing can be expanded and positioned on FIG. 21 to precisely coincide with the locations of the traps. In other words, once the drawing is expanded in FIG. 21, it will appear identical to the drawing shown in FIG. 20.

The use of setup unit 190 eliminates the requirement that the operator produce a sketch or drawing of the building and manually locate and number the various traps in the drawing on the building. However, use of both techniques can be used so that the setup unit 190 operates as a check on the sketch and manual setup that has been described previously.

Figure 22:
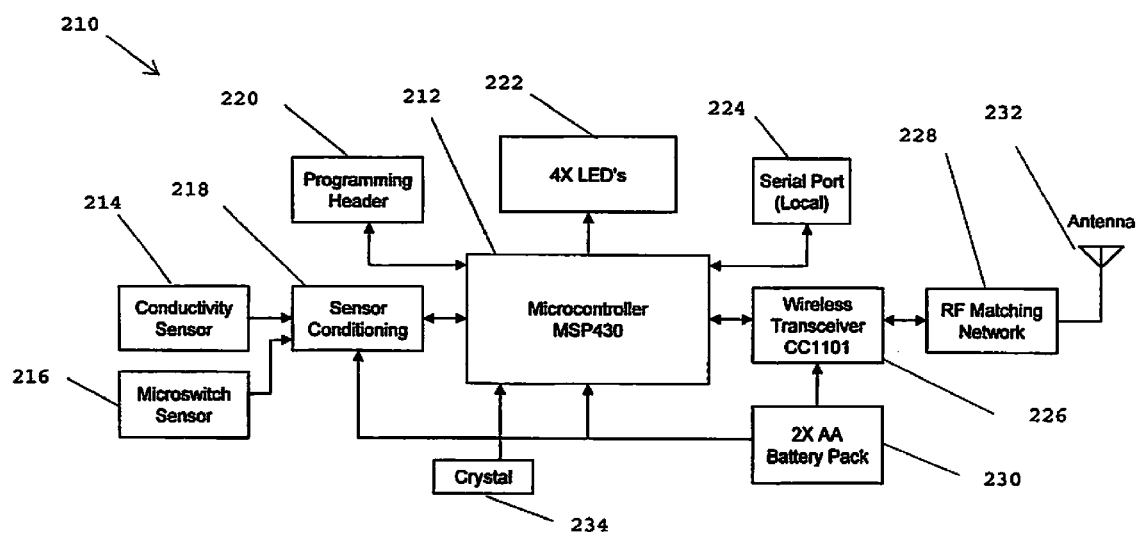
FIG. 22 shows a circuit of a remote transceiver utilized in connection with systems according to the disclosure.

Referring now to FIG. 22, there is shown a block diagram of a circuit 210 of a remote transceiver, such as transceiver 62. The circuit 210 is built around a microcontroller 212 that may be an msp430, but it may be other microprocessors as well. The microcontroller 212 receives its main inputs from a conductivity sensor 214 and a micro-switch sensor 216. These two sensors 214 and 216 represent the various sensors that may be used to detect animals in a trap, and the signals from sensors 214 and 216 are conditioned by a sensor conditioning circuit 218. For example, in the case of the conductivity sensor 214, the output voltage of the sensor would be amplified and provided to a comparator to determine when the resistance or conductivity of the sensor 214 changed dramatically which would occur when an animal touches the sensor in a trap.

The signals from the sensor conditioning circuit 218 are provided to the microcontroller 212. As previously described, the microcontroller 212 operates in a sleep mode but is responsive to the signals from the sensor conditioning circuit 218 to awake and record the sensor input. Typically, the microcontroller 212 will update a counter and determine whether a sufficient count has been reached to report the presence of an animal. If a sufficient count has been reached and the capture of the animal has been previously reported, the microcontroller will simply update the counter and go to sleep. On the other hand, if the appropriate count has been achieved to indicate the presence of an animal, and the animal has not been previously reported, the microcontroller 212 will actuate a transceiver 226 and transmit a signal through an RF matching network 228 and an antenna 232 indicating the presence of an animal in the trap and also transmitting the unique number of this particular remote circuit 210.

The programming of the microcontroller 212 is provided to the microcontroller 212 through programming header 220 and the operating parameters may be modified through serial port 224 or through signals received through the wireless transceiver 226. The computer program controlling the microprocessor 212 is stored in a memory internal to the microcontroller. In this particular embodiment four LEDs 222 are connected to the microcontroller 212 and are illuminated to indicate various conditions of the microcontroller. For example, one LED may be illuminated when the conductivity sensor 214 is actuated once by an animal. Another LED may be illuminated to indicate that a particular number of triggers have been sensed by the conductivity sensor 214 or 216 and the remote unit is transmitting to the base station. Yet another LED may indicate that the remote unit is receiving transmissions from the base station and the fourth LED may indicate that micro-controller has been reset with its counter reset to 0 so that it is waiting on the first animal to appear in the trap and actuate a sensor. The microcontroller 212 is also connected to a crystal 234 that is used to provide timing for the internal clock of the microcontroller.

Figure 23:
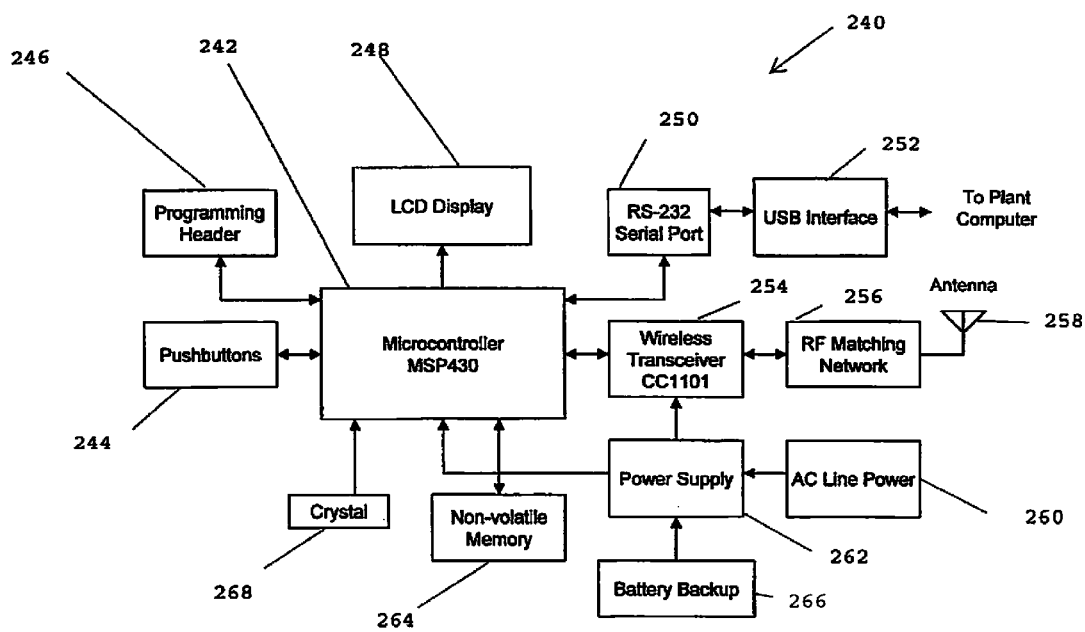
FIG. 23 shows a simplified block diagram of a circuit of a master base unit utilized with systems according to the disclosure.

Referring to FIG. 23, a simplified block diagram 240 is shown illustrating the electronic circuit of the master base unit 56. In this particular embodiment, a suitable microcontroller 242 is an MSP430, but other microcontrollers may be used. Push buttons 244 provide manual signals from the user into the microcontroller 242 and an LCD display 248 is provided to indicate information to a user. For example, the push buttons 244 may be actuated to cause the microcontroller 242 to display information regarding the traps that have captured animals. This information will be displayed on an LCD display 248 and may be scrolled using the push buttons 244. The microcontroller 242 is connected through an RS232 serial port 250 and a USB interface 252 to the plant computer, such as the plant computer 28. As previously discussed, the microcontroller 242 reports data to the plant computer that it received from the remote transceivers on the animal traps. Also, the microcontroller 242 may receive instructions from the plant computer through the port 250 and the USB interface 252.

The microcontroller 242 also receives input from a wireless transceiver 254 and an RF matching network 256 that is connected to an antenna 258. If desired, the plant computer can communicate with the microcontroller 242 through the wireless transceiver 254, but use of the serial port 250 is preferred for communications with the plant computer. The primary use of the wireless transceiver 254 is to communicate with the remote transceivers located on animal traps around a particular plant. Again, as previously discussed, the remote transceivers report when an animal has been captured, and they periodically wake up and report to the microcontroller 242 that they are operating and will report their latest account of triggers caused by animals. Also, when the remote transceivers wake up and report in, the microcontroller 242 can reprogram the remote transceivers through the wireless transceivers 254.

A power supply 262 is connected to an AC power line and to a battery back-up 266. The power supply 262 provides un-interruptible power to the microcontroller 242 and allows the wireless transceiver circuit to remain in a continuously listening state so as not to miss any remote station transmissions. The microcontroller 242 is also connected to a crystal 268 for providing a timing signal for its internal clock and is connected to a non-volatile memory 264 where data is stored.

Having described multiple embodiments and details of the various embodiments, it will be understood that the foregoing description is not intended to be limiting. The disclosure is capable of numerous re-arrangements, modifications and substitutions of parts without departing from the scope and spirit of the disclosure.

What is claimed is:

1. An apparatus for tracking animals in a plant, comprising:
   a plurality of animal traps located at discrete locations in the plant, each trap including an animal sensor for detecting an animal trapped by the trap and a transceiver in electronic communication with the animal sensor, the transceiver being programmed with an identifier and being operable to transmit a signal including the identifier, the transceiver being programmed to transmit the signal when the sensor detects an animal in the trap;
   a computer apparatus including a plurality of computers for receiving and reporting information relating to conditions of the traps, the computer apparatus including:
   a master base computer proximate the plant and in communication with the transceiver on each of the traps for receiving the signals generated by the transceivers and for sending information to the transceiver of each of the traps;
   a provider computer remote from the plant for communicating with the master base computer and receiving information as to the condition of the traps including information corresponding to which traps have a trapped animal, the provider computer being operable to process the information and generate trap reports corresponding to the condition of the traps;
   a professional computer remote from the provider computer and communicating with the provider computer for receiving the trap reports corresponding to the condition of the traps, the professional computer being operable to process the trap reports and generate customer reports corresponding to the condition of the traps;
   a customer computer remote from the professional computer and communicating with the professional computer for receiving customer reports;
   a layout template of the plant including information on the template indicating discrete locations of the traps within the plant; and
   input means for inputting the discrete locations of the traps from the layout template into the computer apparatus for processing to yield a computer-generated template of the plant showing the discrete locations of the traps in the plant, the provider computer being operable to generate the trap reports based in part on the computer-generated template and the information as to the condition of the traps.

2. The apparatus of claim 1, wherein the portable layout template comprises a paper template upon which each of the discrete locations of the traps are denoted on the template by a designation for each of the discrete locations and indicia corresponding to the identifiers of the transceivers, and wherein the input means comprises a scanner and software to read the paper template, the designations and the indicia and generate an electronic template of the plant having thereon the discrete location of each of the traps matched to the identifiers of the transceivers.

3. The apparatus of claim 1, wherein the portable layout template comprises a paper template upon which each of the discrete locations of the traps are denoted on the template a designation for each of the discrete locations and indicia corresponding to the identifiers of the transceivers, and wherein the input means comprises a computer processor having an electronic layout template of the plant and a listing of the identifiers, and a controller responsive to a user for moving each of the identifiers to the appropriate location on the electronic template so that the electronic template corresponds to the paper template and shows the location of the traps in the plant with indicia corresponding to the identifiers of the transceivers.

4. The apparatus of claim 1, wherein the master base computer communicates to the provider computer the identifier of each transceiver of each of the traps.

5. The apparatus of claim 1, wherein the transceiver includes a resistance sensor and the animal sensor comprises a pair of conductors in electrical communication with the transceiver, the conductors being spaced apart and extending adjacent an interior wall of the trap for contacting an animal within the trap, wherein when the animal contacts the conductors a conductive path occurs across the conductors which is sensed by the resistance sensor.

6. The apparatus of claim 5, wherein the conductors have distal rounded tips for contacting animal within the trap.

7. The apparatus of claim 5, wherein the conductors extend substantially outwardly from the interior wall.

8. The apparatus of claim 5, wherein the conductors extend substantially flush with the interior wall.

9. The apparatus of claim 1, wherein the transceiver includes a resistance sensor and wherein the sensor comprises at least first and second conductive pads disposed along a floor of the trap, the first conductive pad being in electrical communication with a first conductor and the second conductive pad being in electrical communication with a second conductor, the first and second conductors being connected to the resistance sensor so that an animal standing on both the first and second pads is sensed by the resistance sensor.

10. The apparatus of claim 5, wherein the trap is metal and one of the conductors is also in electrical communication with the trap and spaced from the other conductor which has an exposed portion within the trap.

11. The apparatus of claim 1, wherein the sensor comprises a light sensor.

12. The apparatus of claim 1, wherein the sensor comprises an ultrasonic sensor.

13. Apparatus for trapping animals in a plant, comprising:
a plurality of animal traps located at discrete locations of the plant, each trap including an animal sensor for detecting an animal trapped by the trap and a transceiver in electronic communication with the animal sensor, the transceiver having an identifier, wherein when the sensor detects an animal trapped by the trap the sensor sends a signal to the transceiver;
a computer system having a plurality of computers in communication with one another for receiving and reporting information relating to conditions of the traps, the computer system comprising: a master base computer proximate the plant and in communication with the transceiver of each of the traps for receiving information from the transceiver and sending information to the transceiver of each of the traps, professional computer, a plant computer, and a provider computer remote from the plant and the master base computer and in communication with the professional computer and the plant computer for sending and receiving information therebetween;
a portable GPS locator transceiver operable to communicate with each one of the transceivers and to identify each of the discrete locations of the traps; and
input means for inputting the discrete locations of the traps from the portable GPS locator transceiver into a computer processor for processing to yield a computer generated template of the plant having a template of the plant with the discrete locations of the traps.

14. Animal control apparatus for use in a plant, comprising:
a plurality of animal traps located at discrete locations of the plant, each trap including an animal sensor associated with the trap for detecting an animal trapped in the trap and a transceiver in electronic communication with the animal sensor, the transceiver having an identifier unique to the trap with which it is associated;
a computer system having a plurality of computers in communication with one another for receiving and reporting information relating to conditions of the traps;
means for obtaining and inputting the discrete locations and identifiers into a computer processor for processing to yield a computer generated template of the plant having a template of the plant with the discrete locations of each of the traps identified.

* * * * *